3,519,634
S-SUBSTITUTED 2,6-DICHLORO-4-THIOPYRIDINE-
3,5-DICARBONITRILES
Gunther Mohr, Klemens Schührer and Sigmund Lust,
Darmstadt, Germany, assignors to E. Merck A.G.,
Darmstadt, Germany
No Drawing. Filed Apr. 3, 1968, Ser. No. 718,346
Claims priority, application Germany, Apr. 5, 1967,
M 73,474
Int. Cl. C07d 31/50
U.S. Cl. 260—294.8    25 Claims

ABSTRACT OF THE DISCLOSURE

A pesticidal composition comprising a compound of the formula

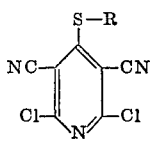

I wherein
R represents alkyl of up to 18 carbon atoms optionally mono- or polysubstituted by fluorine, chlorine and/or $R_1$, A benzyl or phenylethyl residue optionally mono- or polysubstituted in the nucleus by CN, $OR_2$, $NO_2$, halogen, $COOR_2$ and/or $R_2$, Cyclopentyl, or cyclohexyl;

$R_1$ represents CN, $COOR_2$, or lower alkoxy or alkylthio of up to 4 carbon atoms; and $R_2$ represents lower alkyl of up to 4 carbon atoms.

SPECIFICATION

This invention relates to 2,6-dichloro-3,5-dicyano-4-(R-thio)-pyridine derivates, and especially to pesticidal applications thereof.

A principal object of this invention, therefore, is to provide novel pyridine derivatives, intermediates therefor, and processes for their production.

Another object is to provide pesticidal compositions and methods of administering same.

A still further object is to provide combined pesticidal and fungicidal compositions.

Upon further study of the specification and appended claims, other objects and advantages of the invention will become apparent.

To attain these objects, there are provided compounds of Formula I

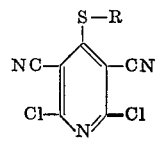

I wherein
R represents a straight or branched chain alkyl residue of up to 18 carbon atoms, optionally mono- or polysubstituted by fluorine, chlorine and/or $R_1$;

Or a benzyl or phenylethyl residue optionally mono- or polysubstituted in the nucleus by CN, $OR_2$, $NO_2$, halogen, $COOR_2$ and/or $R_2$;

Or a cyclopentyl or cyclohexyl residue;

$R_1$ represents CN, $COOR_2$, or lower alkoxy- or alkylthio residues of preferably up to 4 carbon atoms; and $R_2$ represents lower alkyl of up to 4 carbon atoms.

These compounds are valuable pesticides. This excellent fungicidal effect, in particular, was demonstrated in experiments with the known test fungi Venturia inaequalis and Alternaria spec. In addition, it was determined that the novel compounds of Formula I can also be employed advantageously in combination with other pesticides, especially with other fungicides, as well as with all other agents conventionally employed in pesticidal compositions.

The effectiveness of the novel compounds with respect to the fungicidal effect thereof was determined, for example, in the spore germination test. The $LD_{50}$ was also determined, i.e., the amount of active agent (measured in mg./100 cm.$^2$) preventing the germination of the fungus spores to a degree of 50%. As control substances employed for purposes of comparison were N-trichloromethylthiotetrahydrophthalimide and zinc dimethyl dithiocarbamate. As an example of the effectiveness of the compounds of this invention, the 2,6-dichloro-4-methylthiopyridine-3,5-dicarbonitrile exhibited a 3-fold and 7-fold increase in the fungicidal effect of the respective control substances. The details of these tests are as follows:

A 0.1 percent (by weight) solution of the fungicide to be tested in acetone is prepared and diluted stepwise down to a concentration of 0.0001 percent; 0.035 ml. of each of these solutions are separated and the solvent allowed to evaporate in the open air for 30 minutes. Two drops of an aqueous suspension of conidiospores of the test fungus are placed upon the layer of active ingredient thus obtained, the samples are kept for 24 hours at 21 to 22° C. in a humid atmosphere, and thereafter the percentage of the germinated spores is determined by counting them under a microscope.

Referring now to the generic Formula I, when the residue R is a straight or branched chain alkyl residue of up to 18 carbon atoms, R includes, but is not limited to: methyl, ethyl, n-propyl, isopropyl, n-, sec.- and tert.-butyl, isobutyl, amyl, hexyl, heptyl, octyl, nonyl, decyl, undecyl, dodecyl, stearyl as well as the isomers of these compounds and the higher homologs of up to 18 carbon atoms.

The above-mentioned residues are optionally mono- or polysubstituted either by chlorine, or also by fluorine. By "polysubstituted" is meant: substituted by 2 to 7, preferably 2 to 4, fluorine and/or chlorine atoms and/or $R_1$ groups, wherein the $R_1$ groups can be the same or different from each other.

Particularly preferred alkyl residues are those terminally substituted (omega-substituted) by fluorine or chlorine (especially by chlorine), e.g., fluoromethyl, 2-fluoroethyl, 3-fluoropropyl, 4-fluorobutyl, 5-fluoropentyl, 6-fluorohexyl, chloromethyl, 2-chloroethyl, 3-chloropropyl, 4-chlorobutyl, 5-chloropentyl, 6-chlorohexyl, 18-chlorooctadecyl, 1-methyl-2-chloroethyl.

As residues polysubstituted by halogen, examples include but are not limited to 2,2,2-trifluoroethyl, 2,2,2-trichloroethyl, 2,3-dichloropropyl, and 3,4-dichlorobutyl. 2,2-bis-(trichloromethyl)-ethyl, 2,2-bis-(trifluoromethyl)-ethyl, 2-trifluoromethyl - 2 - trichloromethyl-ethyl, 1,1-difluoro-2,2-dichloro-ethyl, 2,3,3,3-tetrachloropropyl, heptachloroisopropyl, 1,2-difluoro-2,2-dimethyl-ethyl, 1-fluoro-1-methyl-3,3,3-trichloro-propyl, 1,2,9,10,17,18-hexachloro-octadecyl.

If when the residue R is substituted by CN, particularly advantageous compounds are cyanomethyl, 2-cyanoethyl anl 3-cyanopropyl; furthermore dicyanomethyl, tricyanomethyl, cyano - butoxycarbonylmethyl, 1,2 - dicyanoethyl, dicyanochloromethyl, 2,2-dicyanoethyl and 1,1,2,2-tetracyanoethyl compounds.

Typical residues R substituted by $COOR_2$ include but are not limited to carbomethoxymethyl, carbethoxymethyl and 2-carbethoxyethyl. Residues R polysubstituted by $COOR_2$ may be: bis-(carbomethoxy)-methyl, bis-(carbethoxy)-ethyl, bis - (carbomethoxy) - chloromethyl, bis-(carbomethoxy) - fluoromethyl, bis-(carbethoxy)-fluoromethyl, 1,2-bis-(butoxycarbonyl)-ethyl, 2,3-bis-(butoxycarbonyl)-propyl.

Lower alkoxy or alkylthio residues include but are not limited to methoxy, ethoxy, propoxy and butoxy, or methylthio and ethylthio residues. Normally, only 1–2 of these substituents are present. Residues R, polysubstituted by alkoxy or alkylthio groups, may be for example: 2,3-dimethoxypropyl, 2-methoxy-3-methylthiopropyl, 1,2-dimethylthioethyl.

If the aralkyl residues embraced by the definition of R are nuclear-substituted by lower alkyl groups, the preferred groups are methyl, ethyl and propyl. Examples of aralkyl residues include, but are not limited to: benzyl, 1- or 2-phenylethyl, 4-cyanobenzyl, 4-methoxybenzyl, 4-nitrobenzyl, 2,4-dinitrobenzyl, 4-fluorobenzyl, 2-, 3- and 4-chlorobenzyl, 2-(4-chlorophenyl)-ethyl, 2,4- and 2,6-dichlorobenzyl, 4-bromobenzyl, 4-carbethoxybenzyl and 4-methylbenzyl. Polysubstituted aralkyl residues include 2-chloro-5,6-dimethyl-4-nitrobenzyl, 2-chloro- 5 -methoxy-4-nitrobenzyl, 2,3,6-trichloro - 4 - cyano-benzyl, 4-ethoxycarbonyl-3-isopropylbenzyl, 2-chloro - 4 - fluorobenzyl, 3-chloro-4-cyano-5-methylbenzyl.

The compounds of this invention can be prepared, for example, by treating with a chlorination agent a pyridone derivative of Formula II

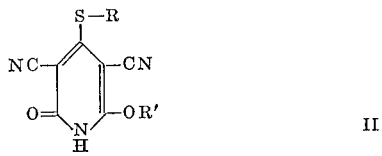

wherein
R has the above-indicated meanings; and
R'' represents hydrogen or an equivalent of an alkali, alkaline earth, or ammonium cation;

Or by reacting in a conventional manner, in the presence of a base, a compound of Formula III

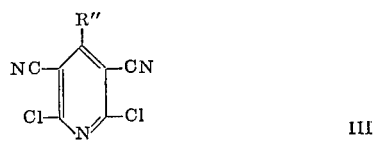

wherein
R'' represents a reactively esterified hydroxy group, preferably a halogen atom, such as chlorine, with a mercaptan of the formula R—SH;

Or by replacing, in 2,6-dichloro-4-mercaptopyridine-3,5-dicarbonitrile, the hydrogen atom by the substituent R with the aid of conventional methods for the purpose of forming thioethers;

And/or by converting, if desired, in a compound of Formula I the substituent R in a conventional manner into another substituent R.

The chlorination of a compound of Formula II is conducted in a known manner by the effect of chlorination agents, such as, for instance, $PCl_5$, $PCl_3$, $POCl_3$ or $SOCl_2$, or mixtures of these substances. Suitable solvents include all organic solvents inert under these conditions, such as, for example, benzene, toluene, xylene, pyridine, dimethylformamide or dimethylaniline, or mixtures of these solvents. In many cases, it proved advantageous, however, to employ the chlorination agent itself as the solvent. Thus, good yields are obtained, for example, with $PCl_5$ in boiling $POCl_3$. The reaction temperatures in these chlorination processes range generally between 50 and 160° C.; and the reaction times generally range between about 30 minutes and 6 hours. The reaction mixture is worked up in a conventional manner, for example, by decomposing the reaction mixture with ice water or alcohols, e.g., methanol or ethanol; during this step, the desired compounds of Formula I generally precipitate.

The pyridones of Formula II to be employed as the starting material can be produced by reacting 3,3-bis-(alkylthio)-2-cyanomethyl acrylate with cyanocetamide and subsequent cyclization of the thus-obtained 2-carbomethoxy-3-alkylthio - 4 - carbamoyl-glutaconic acid dinitrile with methanolic ammonia (for details of this technique, see J. Pharm. Soc. Japan, vol. 85, p. 387, 1965).

When converting compounds of Formula III into the substances of Formula I, all methods can be employed which are conventionally used in the reaction of halogen compounds with mercaptans. The starting material is preferably the chlorine compound (III, R''=Cl), because this compound can be prepared especially simply, e.g., by the effect of sulfuryl chloride upon 4-alkylthio-2,6-dichloro-pyridine-3,5-dicarbonitriles. The reaction with the mercaptans R—SH is conducted in a basic medium, preferably in the presence of strong bases, such as NaOH, KOH, $Ba(OH)_2$, $Ca(OH)_2$, ammonium bases, such as trimethylbenzylammonium hydroxide or tertiary amines, such as triethylamine. Suitable solvents include, for example, diethylether, tetrahydrofuran, dioxane, benzene, toluene, xylene or petroluem ether. The reaction times range approximately between 30 minutes and 12 hours, and the temperatures between −20 and +30° C.

It is possible to convert 2,6-dichloro-4-mercaptopyridine-3,5-dicarbonitrile into the thioethers of Formula I in an analogous manner, for example by reacting with compounds of the formula R—R'', preferably with RCl, RBr or RI.

The methods described in Houben-Weyl, "Methoden der Organischen Chemie" [Methods of Organic Chemistry], Georg Thieme Publishers, Stuttgart (1955), vol 9, pp. 103, et seq., can be employed for the last-mentioned reactions, it being routine and not undue experimentation for a chemist to adapt these methods to preparation of the instant compounds.

As a further method modifying the substituent R in the 4-position, compounds of Formula I can be converted into other compounds of Formula I. Thus, it is possible, for example, to introduce by halogenation in a conventional manner a halogen substituent into the nucleus of a benzyl or phenylethyl residue.

Specific novel intermediates for producing the new substituted pyridines are for example:

2-hydroxy-4-methylmrecapto-2-pyridone-3,5-dicarbonitrile,
2-hydroxy-4-ethylmercapto-2-pyridone-3,5-dicarbonitrile,
2-hydroxy-4-n-propyl-mercapto-2-pyridone-3,5-dicarbonitrile,
2-hydroxy-4-isopropylmercapto-2-pyridone-3,5-dicarbonitrile,
2-hydroxy-4-tert.-butylmercapto-2-pyridone-3,5-dicarbonitrile,
2,4,6-trichloro-pyridine-3,5-dicarbonitrile,
2,6-dichloro-4-bromo-pyridine-3,5-dicarbonitrile,
2,6-dichloro-4-mercapto-pyridine-3,5-dicarbonitrile.

Insofar as the novel compounds of Formula I can be employed in combination with other fungicides, the following fungicides of the Fungicide Table are particularly suitable (either individually or in a mixture):

FUNGICIDE TABLE

Copper-containing fungicides (e.g., cuprous oxide, copper oxychloride, copper sulfate, copper-zinc chromate, basic copper carbonate, bordeaux mixture (mixture of copper sulfate, lime, and water), copper naphthenate, copper salt of 8-hydroxyquinoline), sulfur-containing fungicides (e.g., wettable sulfur, polysulfides, sulfur-lime solutions [aqueous solutions of calcium polysulfides and calcium thiosulfate]) mercury-containing fungicides (e.g., mercuric chloride, phenylmercuric acetate, benzoate and chloride, ethylmercuric acetate and chloride, 2-methoxyethylmercuric chloride, silicate or phosphate, 3-chloromethoxypropylmercuric acetate, ethylmercury 2,3-dihydroxypropyl mercaptide, N-(ethylmercury)-p-toluenesulfonic acid anilide, N-(methylmercury)-, N-(ethylmercury)- and N-(phenylmercury)-1,4,5,6,7,7-hexachlorobicyclo-[2,2,1]-5-heptene-2,3-dicarboximide, S-(ethylmercury)-thiosalicylic acid sodium salt, methylmercury-8-hydroxyquinolate, methylmercury-dicyandiamide, phenylmercury urea, phenylmercury triethanolammonium lactate, phenylmercury monoethanolammonium acetate, tin-containing fungicides (triphenyl tin hydroxide or acetate); furthermore organic fungicides, such as thiocarbamates (sodium, potassium, ammonium, zinc, iron and manganese salts of the monomethyldithio-, dimethyldithio- and ethylenebisdithio-carbamic acids), thiurams (tetramethylthiuram disulfide, polyethylenethiuram disulfide); 2-mercaptobenzothiazole and the salts thereof; pentachlorophenol; chloronitrobenzenes (e.g., pentachloronitrobenzene, 2,3,5,6-tetrachloronitrobenzene, trichlorodinitro- and -trinitro-benzenes); trichloronitromethane;

2-sec.-butyl-4,6-dinitrophenyl-3'-methyl-2'-butenoate, 1-thiocyano-2,4-dinitrobenzene;
hexachlorobenzene;
7-methyl-1,3-dithiolo[4,5-b]-quinoxalinone-(2);
N,N-dimethyl-N'-phenyl-N'-(dichlorofluoromethylthio)-sulfamide;
quinone derivatives (e.g., tetrachloro-p-benzoquinone, 2,3-dichloro-1,4-naphthoquinone, 1,4-dithia-anthraquinone-2,3-dicarbonitrile);
N-trichloromethylthiotetrahydrophthalimide, N-trichloromethylthiophthalimide, N-(1,1,2,2-tetrachloroethylthio)-tetrahydrophthalimide;
2,4-dinitro-6-(α-methylheptyl)-phenyl-crotonate;
N-dodecylguanidine acetate;
3,5-dimethyltetrahydro-1,3,5-thiadiazine-2-thione;
2,4-dichloro-6-(2-chloroanilino)-1,3,5-triazine;
5-amino-1-[bis-(dimethylamino)-phosphinyl]-3-phenyl-1,2,4-triazole;

and also antiobiotics, e.g., tetracycline, chlortetracycline, hydroxytetracycline, streptomycins and cycloheximide (a generic name for 3-[2-(3,5-dimethyl-2-oxocyclohexyl)-2-hydroxyethyl]glutarimide).

The compounds of Formula I can be formulated into all conventional types of pesticidal compositions. With the addition of the conventional carriers and/or fillers, it is possible, for example, to prepare sprayable or dusting agents including inert pulverulent solids, as well as preservative agents for the preservation of seed, all of which agents can contain, if desired, further additives, such as dispersing or wetting agents. With the use of appropriate additives, it is likewise possible to process the active compounds into solutions, emulsions, and aerosol formulations.

For liquid formulations hydrocarbons are used, for example xylene, solvent naphtha, petroleum, cyclohexane, tetrahydronaphthaline, decahydronaphthaline. In addition, aliphatic alcohols such as methanol, ethanol, isopropanol, isobtanol, n-butanol or hexanol are useful. Other suitable solvents are glycol ethers such as methylglycol, ethylglycol, ketones such as acetone, methylethylketone, diethylketone, methylisobutylketone, isophorone, cyclohexanone, methylcyclohexanone. Suitable solvents are furthermore, dioxane, dimethylformamide, N-methylpyrrolidone, dimethylsulfoxide and acetonitrile.

It is possible to employ the said solvents individually or in combination.

Often it is advantageous to add wetting agents to the solutions. Such wetting agents are for example cationic or anionic or non-ionic surface-active substances such as soaps, for example the salts of lauric acid. Suitable are furthermore alkyl sulfates and alkyl sulfonates, for example sodium dodecylsulfate—or sulfonate; sulfated or sulfonated ethers, sulfonated esters of fatty acids and of glycols, quaternary ammonium salts such as trimethylammoniumiodide, longchained amines and amides; monoethers of polyglycols with longchained aliphatic alcohols such as the reaction products of ethylene oxide or polyethyleneglycols with higher aliphatic alcohols; monoesters of polyglycols with fatty acids, for example with oleic acid; monoethers of polyglycols with alkylated phenols; partially esterfied polyvalent alcohols such as sorbitan trioleate; partially or completely esterified polyglycolethers of polyvalent alcohols. Furthermore, there may be added thickening and dispersing substances, for example cellulose and the derivatives thereof, e.g. methyl-, ethyl-, hydroxypropyl or carboxymethyl-cellulose; furthermore tragacanth, dextrines, pectines and gummi arabicum.

All forms of application generally contain up to 95% of active agent, preferably 0.1 to 95%, more preferably 10 to 80% by weight. In combination preparations, the proportion of the compounds of Formula I in the total proportion of active agent ranges normally between 5 and 95%.

The novel compounds are to be employed in the pest control field. Particularly advantageous is their use as fungicides, where they can be employed in the open field as well as a seed preserving medium. However, compounds can also be utilized as anthelmintics, miticides, nematocides, herbicides, and microbicides, particularly bactericides; in this connection, they are also employed preferably in combination with other active agents. The novel compounds of Formula I have been proven to be particularly effective in combatting phytopathogenic bacteria, e.g., *Xanthomonas oryzae* and *Xanthomonas citri*, which, as is known, often attack, for example, rice and citrus cultures.

In the open field, the active compounds may, for example be applied against *Phytophthora infestans* on potatoes. For this purpose, a sprayable powder as described in Example 2, below, can be applied. It is formulated as an aqueous suspension containing 0.1 to 0.15% by weight of the active ingredient and is applied in an amount of about 100 to 1000 l per hectare, depending on the status of infection of the crop. When used for controlling *Plasmopara viticola* in vine, a sprayable powder according to Example 1, below, can be used in form of an aqueous suspension containing about 0.1% of the active ingredient 1000 to 3000 l per hectare of which are applied.

Preferred products of the present invention are defined by the following sub-generic definitions of R in Formula I.

(A) R represents alkyl of 1–18 carbon atoms or benzyl or phenylethyl optionally monosubstituted in the nucleus by $CH_3$, $CH_3O$, F, Cl, Br, CN or $NO_2$;

(B) R represents primary or secondary alkyl of 1–12 carbon atoms, benzyl or phenylethyl; and (C) R represents primary or secondary alkyl of 1–4 carbon atoms.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

FORMULATION EXAMPLES

Example 1

Sprayable powder:

50% 2,6-dichloro-4-methylthiopyridine-3,5-dicarbonitrile
0.5% sodium-dialkylnaphthalenesulfonate
12% sulfite waste liquor powder
37.5% kaolin Example 2

Sprayable powder:

80% 2,6-dichloro-4-methylthiopyridine-3,5-dicarbonitrile

8% oleic acid-N-methyltauride
12% bentonite

Example 3

Sprayable powder:

30% 2,6-dichloro-4-methylthiopyridine-3,5-dicarbonitrile
50% N-trichloromethylthiotetrahydrophthalimide
1% sodium alkylbenzenesulfonate
3% sulfite waste liquor powder
16% siliceous chalk (a natural mixture of fine quartz and kaolin)

Example 4

Dispersion:

20% 2,6-dichloro-4-methylthiopyridine-3,5-dicarbonitrile
20% 1,4-dithia-anthraquinone-2,3-dicarbonitrile
1% carboxymethylcellulose
2% alkyl phenolpolyglycol ether
1% bentonite
56% water Example 5

Dispersion:

20% 2,6-dichloro-4-methylthiopyridine-3,5-dicarbonitrile
20% 2,6-dichloro-4-phenylpyridrine-3,5-dicarbonitrile
1% carboxymethylcellulose
2% alkyl phenolpolyglycol ether
1% bentonite
56% water Example 6

Dusting agent:

10% 2,6-dichloro-4-methylthiopyridine-3,5-dicarbonitrile
25% ground sulfur
65% talc Example 7

Analogously to Example 1, 50% sprayable powders are formulated containing as the active ingredient one or more of the following compounds, either individually or in a mixture:

2,6-dichloro-4-ethylthiopyridine-3,5-dicarbonitrile
2-6-dichloro-4-(in or iso)-propylthiopyridine-3,5-dicarbonitrile
2,6-dichloro-4-(n or iso)-butylthiopryridine-3,5-dicarbonitrile
2,6-dichloro-4-(n or iso)-amylthiopyridine-3,5-dicarbonitrile
2,6-dichloro-4-benzylthiopyridine-3,5-dicarbonitrile
2,6-dichloro-4-(2-phenylethylthio)-pyridine-3,5-dicarbonitrile Example 8

Analogously to Example 3, 80% sprayable powders are formulated containing, in addition to 50% N-trichloromethylthiotetrahydrophthalimide, 30% of the following substances (individually or in a mixture):

2,6-dichloro-4-(4-nitrobenzylthio)-pyridine-3,5-dicarbonitrile
2,6-dichloro-4-(4-fluorobenzylthio)-pyridine-3,5-dicarbonitrile
2,6-dichloro-4-(2-chlorobenzylthio)-pyridine-3,5-dicarbonitrile
2,6-dichloro-4-(3-chlorobenzylthio)-pyridine-3,5-dicarbonitrile
2,6-dichloro-4-(4-chlorobenzylthio)-pyrdrine-3,5-dicarbonitrile
2,6-dichloro-4-(2,6-dichlorobenzylthio)-pyridine-3,5-dicarbonitrile Example 9

Analogously to Example 4, dispersion concentrates are prepared containing, in addition to 20% 1-4-dithia-anthraquinone-2,3-dicarbonitrile, 20% of the following substances (individually or, optionally, in a mixture with other compounds of Formula I):

2,6-dichloro-4-n-hexylthiopyridine-3,5-dicarbonitrile
2,6-dichloro-4-n-octadecylthiopyridine-3,5-dicarbonitrile
2,6-dichloro-4-cyclopentylthiopyridine-3,5-dicarbonitrile
2,6-dichloro-4-cyclohexylthiopyridine-3,5-dicarbonitrile

EXAMPLES FOR THE PREPARATION OF THE COMPOUNDS

Example A 230 g. of the sodium salt of 4-methylthio-6-hydroxy-2-pydridone-3,5-dicarbonitrile (decomposition point above 300° C.; obtained by reacting 1-cyano-1-carbethoxy-2,2-bis-(methylthio)-ethylene with cyanoacetamide and subsequent cyclization of the thus-obtained, nonisolated 2-carbethoxy-3-methylthio - 4 - carbamoyl - glutaconic acid dinitrile) is dissolved in 5 l. of $POCl_3$. After the addition of 2,080 g. of $PCl_5$, the reaction solution is refluxed for two hours, and then the $POCl_3$ is distilled off. The residue is gently decomposed with ice water, there being precipitated 2,6-dichloro-4-methylthio-pyridine-3,5-dicarbonitrile; yield: 239 g.; M.P. 153° C. (isopropanol).

Example B 114 g. of the crude potassium salt of 4-ethylthio-6-hydroxy-2-pyridone-3,5-dicarbonitrile (obtained by reacting 1-cyano-1-carbethoxy-2,2 - bis - (ethylthio) - ethylene with cyanoacetamide and subsequent cyclization) is dissolved under heating in 500 ml. of $POCl_3$. At 80° C., 100 ml. of dimethylformamide is added dropwise to this solution, and the mixture is allowed to stand for one hour at this temperature. Thereafter, the excess $POCl_3$ is distilled off under reduced pressure, until a crystalline sludge remains. The latter is poured on ice, thus obtaining, by precipitation, 2,6-dichloro-4-ethylthiopyridine-3,5-dicarbonitrile; yield: 95 g. M.P. 114° C. (isopropanol).

Analogously, the following compounds are obtained:

2,6-dichloro-4-ethylthiopyridine-3,5-dicarbonitrile, M.P. 114° C.
2,6-dichloro-4-n-propylthiopyridine-3,5-dicarbonitrile, M.P. 107° C.
2,6-dichloro-4-isopropylthiopyridine-3,5-dicarbonitrile, M.P. 139° C.
2,6-dichloro-4-n-butylthiopyridine-3,5-dicarbonitrile, M.P. 73° C.
2,6-dichloro-4-isobutylthiopyridine-3,5-dicarbonitrile, M.P. 90° C.
2,6-dichloro-4-n-amylthiopyridine-3,5-dicarbonitrile, M.P. 40° C.
2,6-dichloro-4-isoamylthiopyridine-3,5-dicarbonitrile, M.P. 39° C.
2,6-dichloro-4-n-dodecylthiopyridine-3,5-dicarbonitrile, undistillable oil;
2,6-dichloro-4-benzylthiopyridine-3,5-dicarbonitrile, M.P. 111° C.
2,6-dichloro-4-o-chlorobenzylthiopyridine-3,5-dicarbonitrile, M.P. 136° C.
2,6-dichloro-4-p-chlorobenzylthiopyridine-3,5-dicarbonitrile, M.P. 106° C.
2,6-dichloro-4-p-fluorobenzylthiopyridine-3,5-dicarbonitrile, M.P. 100° C.
2,6-dichloro-4-p-methylbenzylthiopyridine-3,5-dicarbonitrile, M.P. 122° C.

Example C

At 0° C., 23 g. of 2,4,6-trichloropyridinedicarbonitrile-(3,5) in 100 ml. of diethyl ether is mixed dropwise with 6 g. of ethylmercaptan in 10 ml. of diethyl ether in the presence of 10 g. of triethylamine. After allowing the reaction mixture to stand for one hour, it is filtered off from the bottom residue, and the solution is concentrated by evaporation. The residue is chromatographed on silica gel (solvent: methylene chloride). In addition to unreacted starting material and the byproduct 2,4,6- triethylthiopyridine - dicarbonitrile-(2,3), approximately 8 g. of 2,6-dichloro-4-ethylthiopyridine-(3,5) is obtained, M.P. 113° C.

Example D

Under the irradiation of a UV-lamp, 24.5 g. of 2,6-dichloro - 4 - methylthiopyridine-dicarbonitrile-(3,5) and 100 ml. of sulfuryl chloride are boiled under reflux for 10 hours. Then, the excess sulfuryl chloride is withdrawn under reduced pressure; the residue is mixed with water, and finally taken up in methylene chloride and chromatographed on silica gel. In addition to 2,4,6-trichloropyridine-dicarbonitrile-(3,5) and other byproducts, there is obtained 5.5 g. of 2,6-dichloro-4-chloromethylthiopyridine-dicarbonitrile-(3,5).

The preceding examples can be repeated with similar success by substituting the generically and specifically described reactants and operating conditions of this invention for those used in the preceding examples.

We claim:
1. A compound of the formula

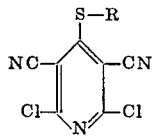

wherein R represents alkyl or up to 18 carbon atoms optionally substituted by 1–4 fluorine and/or chlorine atoms wherein at least one of said fluorine or chlorine atoms is substituted in the terminal position, a benzyl or phenylethyl residue optionally mono- or poly-substituted in the nucleus by $NO_2$, halogen, and/or $R_2$, cyclopentyl, or cyclohexyl; and $R_2$ represents alkyl of up to 4 carbon atoms.

2. A compound as defined by claim 1 wherein R represents alkyl of 1–18 carbon atoms, or benzyl or phenylethyl optionally nuclear substituted by $CH_3$, F, Cl, Br, or $NO_2$.

3. A compound as defined by claim 1 wherein R represents primary alkyl of 1–12 carbon atoms, benzyl or phenylethyl.

4. A compound as defined by claim 1 wherein R represents primary or secondary alkyl of 1–4 carbon atoms.

5. A compound as defined by claim 1 wherein said compound is 2,6-dichloro - 4 - methylthiopyridine-3,5-dicarbonitrile.

6. A compound as defined by claim 1 wherein said compound is 2,6-dichloro-4-ethylthiopyridine-3,5-dicarbonitrile.

7. A compound as defined by claim 1 wherein said compound is 2,6-dichloro - 4 - n - propylthiopyridine-3,5-dicarbonitrile.

8. A compound as defined by claim 1 wherein said compound is 2,6-dichloro - 4 - isopropylthiopyridine-3,5-dicarbonitrile.

9. A compound as defined by claim 1 wherein said compound is 2,6-dichloro-4-n-butylthiopyridine-3,5-dicarbonitrile.

10. A compound as defined by claim 1 wherein said compound is 2,6-dichloro-4-isobutylthiopyridine-3,5-dicarbonitrile.

11. A compound as defined by claim 1 wherein said compound is 2,6-dichloro-4-n-amylthiopyridine-3,5-dicarbonitrile.

12. A compound as defined by claim 1 wherein said compound is 2,6-dichloro-4-isoamylthiopyridine-3,5-dicarbonitrile.

13. A compound as defined by claim 1 wherein said compound is 2,6-dichloro-4-n-hexylthiopyridine-3,5-dicarbonitrile.

14. A compound as defined by claim 1 wherein said compound is 2,6-dichloro-4-n-octadecylthiopyridine-3,5-dicarbonitrile.

15. A compound as defined by claim 1 wherein said compound is 2,6-dichloro-4-cyclopentylthiopyridine-3,5-dicarbonitrile.

16. A compound as defined by claim 1 wherein said compound is 2,6-dichloro-4-cyclohexylthiopyridine-3,5-dicarbonitrile.

17. A compound as defined by claim 1 wherein said compound is 2,6-dichloro-4-benzylthiopyridine-3,5-dicarbonitrile.

18. A compound as defined by claim 1 wherein said compound is 2,6-dichloro-4-(2-phenylethylthio)-pyridine-3,5-dicarbonitrile.

19. A compound as defined by claim 1 wherein said compound is 2,6-dichloro-4-(4-nitrobenzylthio)-pyridine-3,5-dicarbonitrile.

20. A compound as defined by claim 1 wherein said compound is 2,6-dichloro - 4 - (4-fluorobenzylthio)-pyridine-3,5-dicarbonitrile.

21. A compound as defined by claim 1 wherein said compound is 2,6-dichloro-4-(2 - chlorobenzylthio)-pyridine-3,5-dicarbonitrile.

22. A compound as defined by claim 1 wherein said compound is 2,6-dichloro-4-(3-chlorobenzylthio)-pyridine-3,5-dicarbonitrile.

23. A compound as defined by claim 1 wherein said compound is 2,6-dichloro-4-(4 - chlorobenzylthio)-pyridine-3,5-dicarbonitrile.

24. A compound as defined by claim 1 wherein said compound is 2,6-dichloro - 4 - (2,6-dichlorobenzylthio)-pyridine-3,5-dicarbonitrile.

25. A compound as defined by claim 1 wherein R represents primary alkyl of 1–6 carbon atoms, or benzyl or phenylethyl.

References Cited
UNITED STATES PATENTS 3,284,293  11/1966  Mohr et al. _____ 260—294.9

HENRY R. JILES, Primary Examiner

A. L. ROTMAN, Assistant Examiner

U.S. Cl. X.R.

260—294.9; 424—263